(12) United States Patent
Kahrizi et al.

(10) Patent No.: US 11,855,362 B2
(45) Date of Patent: Dec. 26, 2023

(54) HALF DUPLEX MODE DIGITAL BEAMFORMING DEVICE

(71) Applicant: Space Exploration Technologies Corp., Hawthorne, CA (US)

(72) Inventors: Masoud Kahrizi, Irvine, CA (US); Alex Ahmad Mirzaei, Tustin, CA (US); Ali Sajjadi, Irvine, CA (US); Bagher Afshar, Irvine, CA (US); Babak Vakili-Amini, Irvine, CA (US); Alireza Mehrnia, Tustin, CA (US); Behzad Nourani, Irvine, CA (US); Bernd Pregardier, Oceanside, CA (US)

(73) Assignee: Space Exploration Technologies Corp., Hawthorne, CA (US)

( * ) Notice: Subject to any disclaimer, the term of this patent is extended or adjusted under 35 U.S.C. 154(b) by 486 days.

(21) Appl. No.: 16/865,401

(22) Filed: May 3, 2020

(65) Prior Publication Data

US 2020/0388916 A1 Dec. 10, 2020

Related U.S. Application Data

(60) Provisional application No. 62/847,481, filed on May 14, 2019.

(51) Int. Cl.
*H01Q 3/36* (2006.01)
*H01Q 3/26* (2006.01)
(Continued)

(52) U.S. Cl.
CPC ............. *H01Q 3/36* (2013.01); *H01Q 3/267* (2013.01); *H04B 3/52* (2013.01); *H04B 3/54* (2013.01); *H04B 7/0617* (2013.01)

(58) Field of Classification Search
CPC . H01Q 3/267; H01Q 3/36; H04B 3/52; H04B 3/54; H04B 7/0617
See application file for complete search history.

(56) References Cited

U.S. PATENT DOCUMENTS 8,340,619 B1 12/2012 Shirvani-Mahdavi et al.
8,730,102 B2 5/2014 Richards
(Continued)

FOREIGN PATENT DOCUMENTS

CN 103810319 A 5/2014
EP 2717382 A1 4/2014
(Continued)

OTHER PUBLICATIONS

International Search Report and Written Opinion dated Aug. 28, 2020, issued in corresponding International Application No. PCT/US2020/032282, filed May 10, 2020, 12 pages.
(Continued)

*Primary Examiner* — David S Huang
(74) *Attorney, Agent, or Firm* — Polsinelli PC (57) ABSTRACT

In an embodiment, a device is included in a communications system, the device including a plurality of antenna elements configured in a phased array antenna; a plurality of integrated circuit (IC) chips, wherein each IC chip of the plurality of IC chips is associated with a respective subset of antenna elements of the plurality of antenna elements, and wherein, for each IC chip of the plurality of IC chips, the associated subset of antenna elements is used for transmitting and receiving radio frequency (RF) signals by the IC chip; and a local oscillator configured to generate a common local oscillator signal and provide the common local oscillator signal to each IC chip of the plurality of IC chips.

12 Claims, 4 Drawing Sheets

(51) Int. Cl.
*H04B 3/52* (2006.01)
*H04B 3/54* (2006.01)
*H04B 7/06* (2006.01)

(56) References Cited

U.S. PATENT DOCUMENTS

| | | | |
|---|---|---|---|
| 9,666,942 | B2 | 5/2017 | Rasheed et al. |
| 2006/0121869 | A1* | 6/2006 | Natarajan ................ H01Q 3/22 455/276.1 |
| 2009/0273517 | A1* | 11/2009 | Thiesen ............... H01Q 21/065 342/372 |
| 2012/0039366 | A1 | 2/2012 | Wood et al. |
| 2014/0321578 | A1 | 10/2014 | Richards |
| 2017/0149457 | A1* | 5/2017 | Mayer ................... H04L 1/0042 |

FOREIGN PATENT DOCUMENTS

| | | |
|---|---|---|
| KR | 10-0532157 B1 | 11/2005 |
| KR | 10-0914221 B1 | 8/2009 |
| KR | 10-1275548 B1 | 6/2013 |

OTHER PUBLICATIONS

International Search Report and Written Opinion dated Aug. 20, 2020, issued in corresponding International Application No. PCT/US2020/031237, filed May 3, 2020, 15 pages.

* cited by examiner

FIG. 4 ature of this invention will become more readily appreciated
HALF DUPLEX MODE DIGITAL BEAMFORMING DEVICE

CROSS-REFERENCE TO RELATED APPLICATION

The present application claims priority to U.S. Provisional Patent Application No. 62/847,481 filed May 14, 2019 entitled "Digital Beamforming User Terminal," the contents of which is hereby incorporated by reference in its entirety.

BACKGROUND

An antenna (such as a dipole antenna) typically generates radiation in a pattern that has a preferred direction. For example, the generated radiation pattern is stronger in some directions and weaker in other directions. Likewise, when receiving electromagnetic signals, the antenna has the same preferred direction. Signal quality (e.g., signal to noise ratio or SNR), whether in transmitting or receiving scenarios, can be improved by aligning the preferred direction of the antenna with a direction of the target or source of the signal. However, it is often impractical to physically reorient the antenna with respect to the target or source of the signal. Additionally, the exact location of the source/target may not be known. To overcome some of the above shortcomings of the antenna, a phased array antenna can be formed from a set of antenna elements to simulate a large directional antenna. An advantage of a phased array antenna is its ability to transmit and/or receive signals in a preferred direction (e.g., the antenna's beamforming ability) without physical repositioning or reorientating.

It would be advantageous to configure phased array antennas having increased bandwidth while maintaining a high ratio of the main lobe power to the side lobe power. Likewise, it would be advantageous to configure phased array antennas and associated circuitry having reduced weight, reduced size, lower manufacturing cost, and/or lower power requirements. Accordingly, embodiments of the present disclosure are directed to these and other improvements in phased array antennas or portions thereof.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Embodiments of apparatuses and methods relate to digital beamforming transmitters and receivers included in a communications system. In some embodiments, a device is included in a communications system, the device including a plurality of antenna elements configured in a phased array antenna; a plurality of integrated circuit (IC) chips, wherein each IC chip of the plurality of IC chips is associated with a respective subset of antenna elements of the plurality of antenna elements, and wherein, for each IC chip of the plurality of IC chips, the associated subset of antenna elements is used for transmitting and receiving radio frequency (RF) signals by the IC chip; and a local oscillator configured to generate a common local oscillator signal and provide the common local oscillator signal to each IC chip of the plurality of IC chips. These and other aspects of the present disclosure will be more fully described below.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C).

Language such as "top surface", "bottom surface", "vertical", "horizontal", and "lateral" in the present disclosure is meant to provide orientation for the reader with reference to the drawings and is not intended to be the required orientation of the components or to impart orientation limitations into the claims.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

Many embodiments of the technology described herein may take the form of computer- or controller-executable instructions, including routines executed by a programmable computer or controller. Those skilled in the relevant art will appreciate that the technology can be practiced on computer/controller systems other than those shown and described above. The technology can be embodied in a special-purpose computer, controller or data processor that is specifically programmed, configured or constructed to perform one or more of the computer-executable instructions described above. Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini computers and the like). Information handled by these computers can be presented at any suitable display medium, including an organic light emitting diode (OLED) display or liquid crystal display (LCD).

Figure 1:
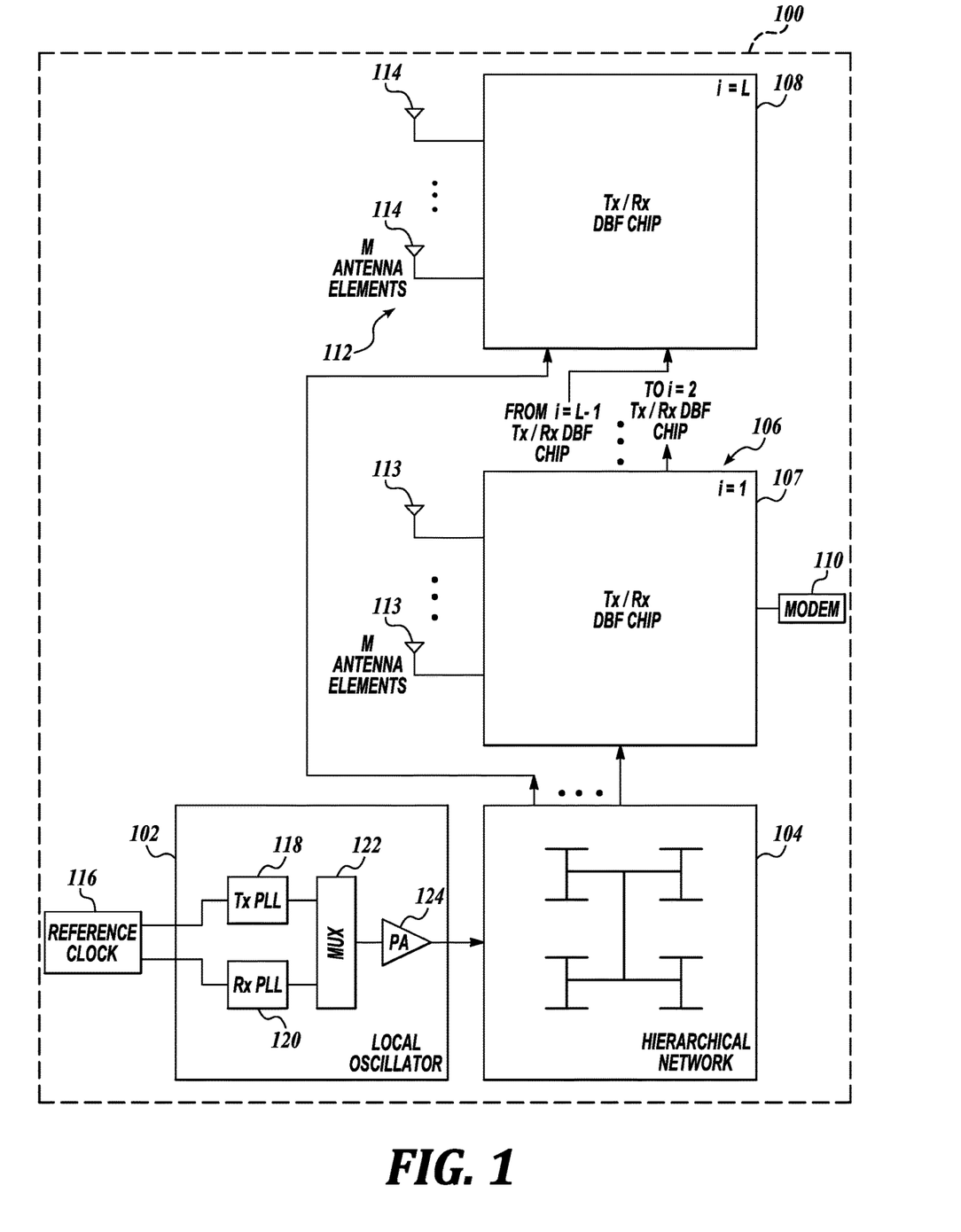
FIG. 1 is an example illustration of a block diagram of at least a portion of a communication node in accordance with some embodiments of the present disclosure.

FIG. 1 is an example illustration of a block diagram of at least a portion of a communication node 100 in accordance with some embodiments of the present disclosure. Communication node 100 includes a local oscillator 102, a hierarchical network 104, a plurality of digital beamformer (DBF) chips 106, a modem 110, a plurality of antenna elements 112, and a reference clock 116. Local oscillator 102 is electrically coupled between the reference clock 116 and the hierarchical network 104. Hierarchical network 104 is electrically coupled between local oscillator 102 and each DBF chip of the plurality of DBF chips 106. Modem 110 electrically couples to the first DBF chip of the plurality of DBF chips 106 (e.g., DBF chip 107). Each DBF chip of the plurality of DBF chips 106 electrically couples with a respective subset of the plurality of antenna elements 112.

Communication node 100, also referred to as a node, communication device, device, and/or the like, comprises a part of a communications system. In some embodiments, communication node 100 is included in a wireless communications system, a wideband communications system, a satellite-based communications system, a terrestrial-based communications system, a non-geostationary (NGO) satellite communications system, a low Earth orbit (LEO) satellite communications system, and/or the like. For example, without limitation, communication node 100 can comprise a satellite, a user terminal associated with user device(s), a gateway, a repeater, or other device capable of receiving and transmitting signals with another device of a satellite communications system.

Local oscillator (LO) 102, in conjunction with the reference clock 116, is configured to provide a common LO signal to each DBF chip of the plurality of DBF chips 106. The common LO signal is provided to mixers included in the plurality of DBF chips 106 to facilitate performance of synchronized frequency up conversion to radio frequency (RF) signals to be transmitted and/or down conversion to received RF signals, as will be described in detail below. Local oscillator 102 includes, without limitation, a transmit phase lock loop (Tx PLL) 118, a receive phase lock loop (Rx PLL) 120, a multiplexer (MUX) 122, and a power amplifier (PA) 124.

The local oscillator 102 comprises an integrated circuit (IC) chip. In some embodiments, reference clock 116 provides a common reference signal to each of the Tx PLL 118 and Rx PLL 120. Tx PLL 118 is configured to generate a signal having a frequency associated with transmission of signals, and the Rx PLL 120 is configured to generate a signal having a frequency associated with receipt of signals. The outputs of the Tx PLL 118 and Rx PLL 120 comprise the inputs to MUX 122.

MUX 122 is configured to select the signal outputted by Tx PLL 118 or Rx PLL 120 in accordance with the transmit or receive mode, respectively, of communication node 100. In each given time, the plurality of DBF chips 106 included in communication node 100 all operate in transmit mode or receive mode.

The output of MUX 122 comprises the input to PA 124. PA 124 is configured to power amplify the signal from the MUX 122. The output of PA 124 comprises the common LO signal generated by a single local oscillator 102 provided to the plurality of DBF chips 106. The common LO signal specifies a precise unmodulated frequency associated with each transmission or receipt of signals by the plurality of DBF chips 106. As an example, the common LO signal may specify a frequency of 5 GigaHertz (GHz) or a frequency that is an integer divided ratio of the RF transmit or receive carrier frequency.

The common LO signal generated by the local oscillator 102 is an input to the hierarchical network 104. Also provided from local oscillator 102 to the hierarchical network 104 is a reference clock signal such as, for example, a 60 MegaHertz (MHz) signal, to be used by respective clock PLLs included in DBF chips 106 as a digital reference clock signal. The common LO signal may include the reference clock information, or the common LO signal and the reference clock signal can comprise separate signals. The common LO signal and reference clock signal are collectively referred to as a common input signal, a common signal, a driving signal, and/or the like for each DBF chip of the plurality of DBF chips 106.

The hierarchical network 104 is configured to route the common input signal to each DBF chip of the plurality of DBF chips 106. The signal pathway length from the input point of the hierarchical network 104 to each output point of the hierarchical network 104 electrically coupled with a respective DBF chip of the plurality of DBF chips 106 is equal to each other. In other words, all of the signal pathway lengths are length matched to each other. The length matching ensures that there is no propagation delay, and thus, introduction of phase differences, in the reference clock signal delivered to the respective DBF chips 106. The accuracy of reference clock signal phase among the DBF chips 106 facilitates synchronizing operations of all of the DBF chips 106 to the same timing.

In some embodiments, the reference clock signal is distributed to each DBF chip of the plurality of DBF chips 106 with the same phase (or same phase range) to each other. Alternatively, the reference clock signal distribution to the plurality of DBF chips 106 can have different phases relative to each other. The different phases can be synchronized or otherwise addressed using calibration or compensation techniques.

In some embodiments, hierarchical network 104 is implemented in one or more layers of a printed circuit board (PCB) stack. Local oscillator 102 and the plurality of DBF chips 106 may also be implemented in one or more layers of the PCB stack, which may be the same or different layer(s) from that of the hierarchical network 104. Hierarchical network 104 comprises an H-network (also referred to as an H-tree network), a fractal network, a self-similar fractal network, a tree network, a star network, a hybrid network, a rectilinear network, a curvilinear network, a rectilinear H-network, a curvilinear H-network, a multiplex feed network, or other networks in which each signal inputted to a network traverses through the same length of traces to outputs to avoid spurious signal delays caused by different trace lengths.

The plurality of DBF chips 106 comprises an L number of DBF chips. For example, DBF chip 107 comprises the first DBF chip (i=1, where i=1 to L), and so forth, to DBF chip 108 comprising the Lth DBF chip (i=L) of the plurality of DBF chips 106. Each DBF chip of the plurality of DBF chips 106 electrically couples with a respective M number of antenna elements of the plurality of antenna elements 112. Continuing the example, DBF chip 107 electrically couples with M antenna elements 113 and DBF chip 108 electrically couples with M antenna elements 114. The plurality of DBF chips 106 is electrically coupled to each other in a daisy chain arrangement. The ith DBF chip of the plurality of DBF chips 106 is electrically coupled with the (i+1)th DBF chip. For example, the first DBF chip (i=1) is electrically coupled between modem 110 and the second DBF chip (i=2). The second DBF chip (i=2) is electrically coupled between the first DBF chip (i=1) and the third DBF chip (i=3). The third DBF chip (i=3) is electrically coupled between the second DBF chip (i=2) and the fourth DBF chip (i=4), and so forth, with the last DBF chip (i=L) electrically coupled to the second to last DBF chip (i=L−1).

Each DBF chip of the plurality of DBF chips 106 comprises an IC chip or IC chip package including a plurality of pins, in which at least a first subset of the plurality of pins is configured to communicate signals with its electrically coupled DBF chip(s) (and/or modem 110 in the case of DBF chip 107), a second subset of the plurality of pins is configured to transmit/receive signals with M antenna elements, and a third subset of the plurality of pins is configured to receive the common LO signal (and reference clock signal) from the hierarchical network 104. The plurality of DBF chips 106 may also be referred to as transmit/receive (Tx/Rx) DBF chips, Tx/Rx chips, transceivers, DBF transceivers, and/or the like.

Figure 3:
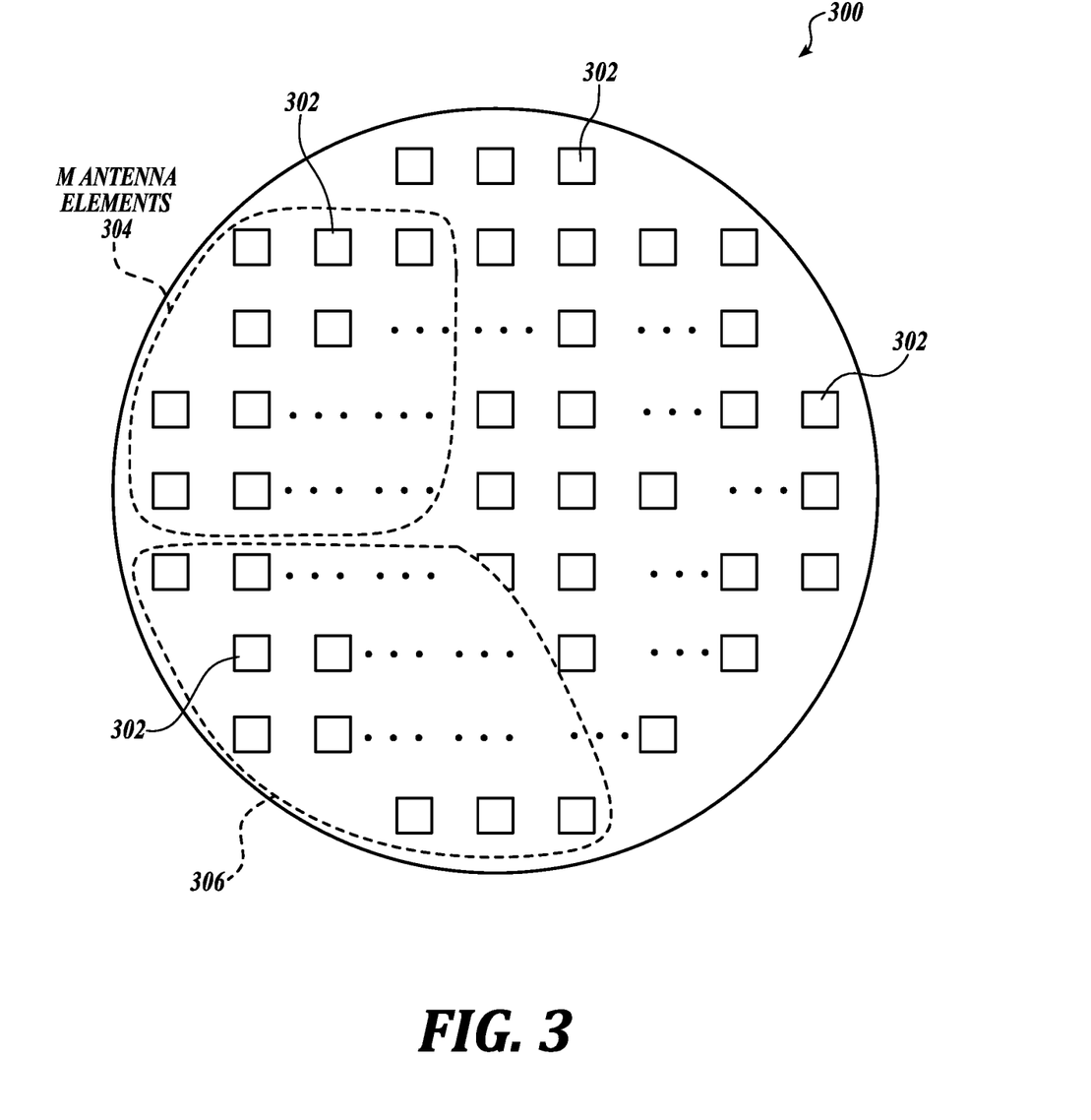
FIG. 3 is an example illustration of a top view of an antenna lattice in accordance with some embodiments of the present disclosure.

FIG. 3 is an example illustration of a top view of an antenna lattice 300 in accordance with some embodiments of the present disclosure. Antenna lattice 300 includes a plurality of antenna elements 302 arranged in a particular pattern to define a particular antenna aperture. The antenna aperture is the area through which power is radiated by or to the antenna elements 302. Antenna lattice 300 defines a phased array antenna. A phased array antenna synthesizes a specified electric field (phase and amplitude) across an aperture.

In some embodiments, the plurality of antenna elements 302 comprises the plurality of antenna elements 112 in FIG. 1. A subset 304 of the plurality of antenna elements 302 can comprise the M antenna elements 113 and a subset 306 of the plurality of antenna elements 302 can comprise the M antenna elements 114. The remaining subsets of antenna elements of the plurality of antenna elements 302 may be similarly associated with the remaining DBF chips of the plurality of DBF chips 106.

Figure 2:
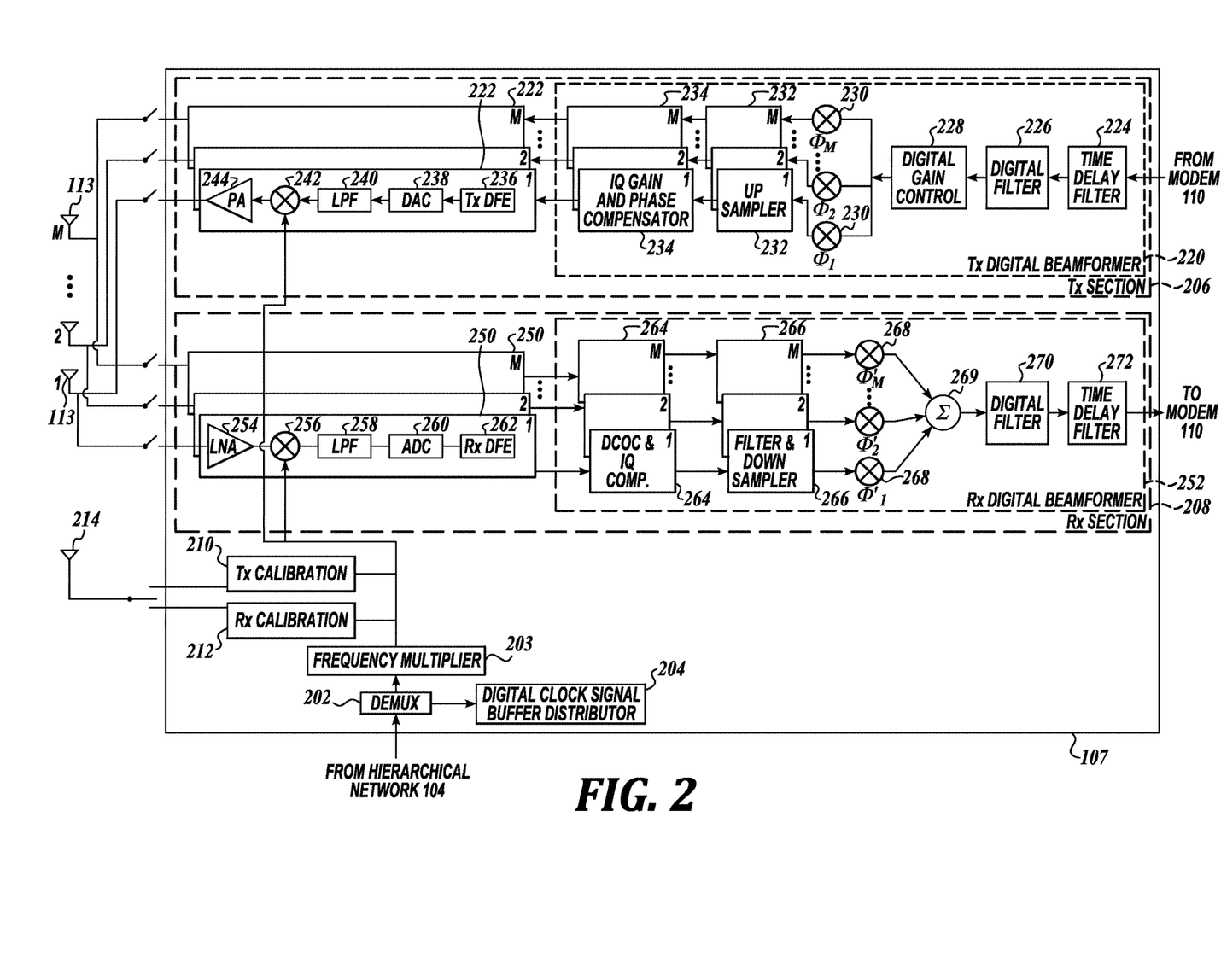
FIG. 2 is an example illustration showing circuitry or electrical components included in and/or associated with a digital beam former (DBF) chip in accordance with some embodiments of the present disclosure.

In some embodiments, each DBF chip of the plurality of DBF chips 106 is configured to operate in half duplex mode—capable of receiving or transmitting RF signals/waveforms but not both simultaneously. FIG. 2 is an example illustration showing circuitry or electrical components included in and/or associated with the DBF chip 107 in accordance with some embodiments of the present disclosure. The contents of each of the DBF chips 106 are similar to that discussed herein for DBF chip 107.

In some embodiments, DBF chip 107 includes a demultiplexer (DEMUX) 202, a frequency multiplier 203, a buffer distributor 204, a transmit section 206, a receive section 208, a transmit calibration 210, and a receive calibration 212. DBF chip 107 is configured to generate RF signals (based on data provided by modem 110) to be transmitted by antenna elements 113, decode RF signals received by antenna elements 113 to provide to modem 110, calibrate the receive section 208 (also referred to as a receiver or receiver section) using the transmit calibration 210 and antenna element 214, and calibrate the transmit section 206 (also referred to as a transmitter or transmitter section) using the receive calibration 212 and antenna element 214.

The common LO signal and reference clock signal are received from the hierarchical network 104 by the DEMUX 202. DEMUX 202 is configured to decouple, segregate, separate, and/or otherwise process the received input signal(s) into individual signals that can be used for respective purposes. For example, without limitation, outputs of the DEMUX 202 can include a reference clock signal, a signal identifying a frequency outputted by the Tx PLL 118, and/or a signal identifying a frequency outputted by the Rx PLL 120 based on the signal(s) received from the hierarchical network 104. The reference clock signal output of DEMUX 202 is provided to the buffer distributor 204 to be distributed for use for all digital clock operations within DBF chip 107 and/or with the other DBF chips of the plurality of DBF chips 106.

The signal identifying a frequency outputted by the Tx PLL 118 or Rx PLL 120 (the common LO signal) from DEMUX 202 comprises the input to frequency multiplier 203. Frequency multiplier 203 is configured to increase the frequency of the Tx or Rx PLL signal by a pre-set amount. For instance, without limitation, frequency multiplier 203 is configured to triple the frequency of the Tx or Rx PLL signal (e.g., frequency multiplier 203 comprises a frequency tripler). Continuing the above example, if the common LO signal has a frequency of 5 GHz, the output of frequency multiplier 203 is a signal having a frequency of 15 GHz (5 GHz×3). The output of frequency multiplier 203 comprises an input to mixers 242 and 256 to up convert or down convert signals that are transmitted or received, respectively.

The output of frequency multiplier 203 is also provided to transmit and receive calibrations 210, 212 to calibrate respective receive and transmit sections 208, 206. Transmit and receive calibrations 210, 212 are also referred to as transmit and receive calibration sections, calibration Tx and Rx, and/or the like. Transmit and receive calibrations 210, 212 are selectively electrically coupled to a calibration antenna element 214. A switch is disposed between the calibration antenna element 214 and each of transmit and receive calibrations 210, 212. If transmit section 206 is to be calibrated, then the switch is configured to electrically couple calibration antenna element 214 to receive calibration 212 (e.g., switch in a first position). If receive section 208 is to be calibrated, then the switch is configured to electrically couple calibration antenna element 214 to transmit calibration 210 (e.g., switch in a second position). If neither of sections 206, 208 is to be calibrated, then the switch can be configured in which there is no electrical coupling with neither transmit nor receive calibrations 210, 212 (e.g., switch in a third position). Although a single switch is depicted in FIG. 2 between calibration antenna element 214 and transmit and receive calibrations 210, 212, it is contemplated that more than one switch can be implemented, a dedicated switch for each of transmit and receive calibrations 210, 212.

Calibration antenna element 214 comprises an antenna element 302 included in the antenna lattice 300. In some embodiments, calibration antenna element 214 is configured for performing calibrations and may not be used for normal or regular signal communication links. Transmit and receive calibrations 210, 212 are configured to facilitate obtaining calibration measurements so as to adapt receive and transmit sections 208, 206, respectively, to compensate for phase and/or time delay mismatch produced by DBF chip 107, PCB traces, associated antenna elements, and/or associated antenna element circuitry.

In some embodiments, calibration antenna element 214 may comprise any of the M antenna elements 113. In such a configuration, a calibration-dedicated antenna element 214 may be optional.

In some embodiments, the transmit section 206 includes a transmit digital beamformer (Tx DBF) section 220 and a plurality of transmit RF sections 222. The transmit digital beamformer section 220 includes a time delay filter 224, a digital filter 226, a digital gain control 228, a plurality of phase shifters 230, a plurality of up samplers 232, and a plurality of IQ gain and phase compensators 234. Transmit digital beamformer section 220 is also referred to as a baseband section, baseband processing section, and/or the like. A single channel including a data signal or stream is provided by the modem 110 and comprises the input to the time delay filter 224.

The time delay filter 224 is configured to encode or apply a particular time delay $\tau_t$ to the received data signal. In an embodiment, time delay filter 224 comprises a finite impulse response filter (FIR), a transversal filter, a Farrow FIR, and/or the like. The time delay encoded data signal is the input to the digital filter 226. Digital filter 226 is configured to de-noise or filter out undesirable signal components from the time delay encoded data signal. Digital filter 226 may be optional where filtering is not necessary due to the quality of the signals provided by the modem 110.

The output of the digital filter 226 is the input to the digital gain control 228. Digital gain control 228 is configured to amplify or apply gain to the filtered signal. The output of the digital gain control 228 is the input to the plurality of phase shifters 230. The phase shifters 230 may also be referred to as phase filters, phase rotators, and/or the like. Each phase shifter of the plurality of phase shifters 230 is configured to encode or apply a particular respective phase to the filtered signal so that the M output signals of the plurality of phase shifters 230 (also referred to as the phase encoded signals) have a different phase relative to each other. For example, without limitation, a first phase shifter (i=1) is configured with phase $\Phi_1$, a second phase shifter (i=2) is configured with phase $\Phi_2$, and so forth, to the Mth phase filter (i=M) is configured for phase $\Phi_M$. Each of the M phase encoded signals comprises a signal encoded with a particular time delay and phase that is different from the other phase encoded signals.

Each of the phase encoded signal is the input to a respective up sampler of the plurality of up samplers 232. The phase encoded signal associated with the first phase shifter is the input to the first up sampler (i=1) of the plurality of up samplers 232, the phase encoded signal associated with the second phase shifter is the input to the second up sampler (i=2) of the plurality of up samplers 232, and so forth. In the transmit section 206, there are M signal pathways or paths, including electrical components, to generate M signals to provide to the respective M antenna elements 113 for transmission. The M phase encoded signals are up sampled by the M number of up samplers 232. Each of the up samplers 232 is configured to resample its respective phase encoded signal to a higher sample rate or density. The M up sampled signals are the inputs to respective IQ gain and phase compensators 234.

The plurality of IQ gain and phase compensators 234 comprises M number of IQ gain and phase compensators 234. IQ gain and phase compensators 234 are configured to compensate for any undesirable offset in the transmit path (e.g., perform phase impairment) that may have occurred during signal processing in RF sections 222.

The M outputs of the IQ gain and phase compensators 234 also comprise the outputs of transmit digital beamformer section 220. The M outputs of the IQ gain and phase compensators 234 are the inputs to the respective transmit RF sections 222. Transmit RF sections 222, also referred to as RF sections, are configured to ready the time delay and phase encoded digital signals for transmission. The plurality of the transmit RF sections 222 comprises M number of transmit RF sections 222, one for each of the M paths. Each transmit RF section 222 includes a transmit digital front end (Tx DFE) 236, a digital-to-analog converter (DAC) 238, a low pass filter (LPF) 240, a mixer 242, and a power amplifier (PA) 244.

In each transmit RF section 222, the Tx DFE 236 receives the output of the respective IQ gain and phase compensator 234, a digital signal. Tx DFE 236 is configured to bridge between the digital baseband processing in the transmit digital beamformer section 220 and the analog RF processing to be performed in the transmit RF section 222. Tx DFE 236 may be responsible for one or more processing functions relating to channelization and/or sample rate conversion. Tx DFE 236 is configured to, among other things, resample the input digital signal to a higher sample rate or density and provide the up sampled signal to the DAC 238. For example, the input digital signal may be up sampled by a factor of four. DAC 238 is configured to convert the input digital signal into an analog signal. DAC 238 may comprise an IQ DAC. The time delay and phase encoded digital signal is now a time delay and phase encoded analog signal. The analog signal is the input to LPF 240.

LPF 240 is configured to low pass filter or de-noise the analog signal. The filtered analog signal is the input to mixer 242. Mixer 242 is configured to perform frequency up conversion to convert the (baseband) center frequency associated with the filtered analog signal to a carrier frequency (e.g., change from $f_{DC}$ to $f_{RF}$). At least a portion of the input signal from the local oscillator 102 is also an input to the mixer 242 in order to perform the frequency up conversion. The mixers 242 of the M transmit RF sections 222 perform synchronized frequency up conversion. The time delayed and phase encoded analog signal provided on a carrier frequency, also referred to as a RF signal, is power amplified by the PA 244.

The amplified RF signal outputted by the PA 244 is the input to an antenna element 113. In turn, the antenna element 113 radiates the amplified RF signal. Each of the M antenna elements 113 is configured to radiate an amplified RF signal generated by a respective transmit RF section 222. In some embodiments, impedance matching is implemented between each M path between the transmit RF sections 222 and the antenna elements 113. In readiness of data to be transmitted, electrical couplings are established between the M antenna elements 113 and the transmit section 206 via switches disposed therebetween, thereby completing the signal paths to the M antenna elements 113 from the M transmit RF sections 222 for transmission.

In an embodiment, transmit RF sections 222 may comprise quadrature direct conversion transmitter (IQ) sections, quadrature direct conversion transmitters, or the like. In each of the transmit RF sections 222, a single PA 244 electrically coupled to two sets of Tx DFE 236, DAC 238, LPF 240, and mixer 242 in parallel may be implemented, in which the first set is configured to process the I portion of the I and Q complex signal and the second set is configured to process the Q portion of the I and Q complex signal. The I and Q complex signals are the digital signal outputted by the IQ gain and phase compensator 234 to the transmit RF section 222.

In some embodiments, the receive section 208 includes a plurality of receive RF sections 250 and a receive digital beamformer (Rx DBF) section 252. When DBF chip 107 is operating in receive mode (as opposed to transmit mode discussed above), the plurality of switches disposed between the M antenna elements 113 and the M receive RF sections 250 are configured to establish respective electrical signal paths therebetween. Each of a M number of RF signals detected by the M antenna elements 113 is an input to a respective receive RF section of the plurality of receive RF sections 250, thereby providing M inputs to the M signal pathways or paths of the receiver section 208.

In some embodiments, the same M antenna elements 113 are supported by both the transmit and receive sections 206, 208. One or more switches may be included between the antenna elements 113 and the transmit and receive sections 206, 208 to selectively electrically couple the M antenna elements 113 to the transmit or receive section 206, 208. Alternatively, components other than switches may be implemented to establish signal pathways between the antenna elements 113 and the desired transmit or receive section 206, 208. In other embodiments, different sets of M antenna elements may be supported by each of the transmit and receive sections 206, 208. A first set of M antenna elements may be supported by the transmit section 206 and a second/different set of M antenna elements may be supported by the receive section 208.

The plurality of receive RF sections 250 comprises M number of receive RF sections. Each receive RF section 250 includes a low noise amplifier (LNA) 254, a mixer 256, a low pass filter (LPF) 258, an analog-to-digital converter (ADC) 260, and a receive digital front end (Rx DFE) 262. In each receive RF section 250, LNA 254 is configured to perform low noise amplification of the analog RF signal received at the respective antenna element 113. The amplified RF signal is the input to the mixer 256. At least a portion of the input signal generated by the local oscillator 102 also comprises an input to the mixer 256. Mixer 256, also referred to as a down converter, is configured to perform frequency down conversion to change the center frequency associated with the amplified signal from the RF carrier frequency to the baseband frequency (e.g., change from $f_{RF}$ to $f_{DC}$). Next, the signal is low pass filtered or de-noised by LPF 258. The filtered signal, which is an analog signal, is converted to a digital signal in ADC 260. ADC 260 may comprise an IQ ADC. The output of ADC 260 is the input to Rx DFE 262.

In each of the receive RF sections 250, a single LNA 254 electrically coupled to two sets of RX mixer 256, LPF 258, ADC 260, and a Rx DFE 262 in parallel may be implemented, in which the first set is configured to process the I portion of the I and Q complex signal and the second set is configured to process the Q portion of the I and Q complex signal.

Rx DFE 262 is configured to bridge between the RF processing in the receive RF section 250 and the digital baseband processing to be performed in the receive digital beamformer section 252. Rx DFE 262 may be responsible for one or more processing functions relating to channelization and/or sample rate conversion. Rx DFE 262 is configured to, among other things, resample the input digital signal to a lower sample rate or density and provide the down sampled signal to the receive digital beamformer section 252.

In some embodiments, receive RF sections 250 may comprise quadrature direct conversion receiver (IQ) sections, quadrature direct conversion receivers, or the like. In each of the receive RF sections 250, a single LNA 254 electrically coupled to two sets of mixer 256, LPF 258, ADC 260, and Rx DFE 262 in parallel may be implemented, in which the first set is configured to process the I portion of the I and Q complex signal and the second set is configured to process the Q portion of the I and Q complex signal. The I and Q complex signal comprises the amplitude and phase, respectively, of the analog RF signal received by a respective antenna element 113.

In some embodiments, the receive digital beamformer section 252 includes a plurality of direct current offset compensator (DCOC) and IQ compensators 264, a plurality of filter and down samplers 266, a plurality of phase shifters 268, an adder 269, a digital filter 270, and a time delay filter 272. The plurality of DCOC and IQ compensators 264 are electrically coupled between the Rx DFEs 262 and the plurality of filter and down samplers 266. The plurality of filter and down samplers 266 is electrically coupled between the plurality of DCOC and IQ compensators 264 and the plurality of phase shifters 268. The plurality of phase shifters 268 is electrically coupled between the plurality of filter and down samplers 266 and the adder 269. The adder 269 is electrically coupled between the plurality of phase shifters 268 and the digital filter 270. The digital filter 270 is electrically coupled between the plurality of phase shifters 268 and the time delay filter 272. Receive digital beamformer section 252 is also referred to as a baseband section, baseband processing section, and/or the like.

The M number of digital signals outputted by the respective receive RF sections 250 comprise the inputs to respective DCOC and IQ compensators 264. The plurality of DCOC and IQ compensators 264 comprises an M number of DCOC and IQ compensators. Each of the DCOC and IQ compensator 264 is configured compensate for any undesirable offsets in the digital signal that may have occurred during signal processing in the receive RF section 250 (e.g., perform phase impairment, DC compensation, etc.), correct for propagation delays, and/or perform other compensations in preparation of phase and time delay decoding. In some embodiments, the digital signal provided to each of the DCOC and IQ compensator 264 includes I and Q components of an IQ complex signal and each of the I and Q components may be separately processed. The compensated digital signals outputted from the DCOC and IQ compensators 264 comprise the inputs to respective filter and down samplers 266.

The plurality of filter and down samplers 266 comprises M number of filter and down samplers, one for each of the M paths of the receiver section 208. Each of the filter and down samplers 266 is configured to remove noise and other undesirable components from its compensated digital signal and down sample the signal to a lower sample rate or density. The output of each of the filter and down samplers 266 is the input to a respective phase shifter 268.

The plurality of phase shifters 268 comprises M number of phase shifters. Phase shifters 268 may also be referred to as phase filters, phase rotators, and/or the like. Each phase shifter of the plurality of phase shifters 268 is configured to decode or apply a particular phase to the filtered signal received from a respective filter and down sampler 266. The particular phase applied is selected to undo or cancel the phase applied to the signal for transmission so as to recover the original or underlying data or signal. For example, without limitation, a first phase shifter (j=1 for j=1 to M) is configured with phase $\Phi'_1$ that will decode phase $\Phi_1$, a second phase shifter (j=2) is configured with $\Phi'_2$ that will decode phase $\Phi_2$, and so forth, to the Mth phase shifter (j=M) configured with $\Phi'_M$ that will decode phase $\Phi_M$.

The outputs of the plurality of phase shifters 268 comprise portions of an original or underlying signal without phase encoding but with time delay encoding still to be removed. Such phase decoded signals from the plurality of phase shifters 268 are added or combined together into a single phase decoded signal by the adder 269. Adder 269 may also be referred to as a summation component or combiner. The single phase decoded signal is the input to the digital filter 270. Digital filter 270 is configured to remove undesirable signal components or de-noise the signal phase decoded signal. The filtered signal is then provided to the time delay filter 272.

Time delay filter 272 is configured to decode the time delay present in the filtered signal, which was applied to transmit the signal. A time delay $\tau_r$ applied to the filtered signal may equal in magnitude to time delay $\tau_t$ present in the filtered signal, thereby removing the time delay present in the signal and complete reconstitution of the original or underlying signal. The original or underlying signal comprises a channel including a data signal or stream, which is provided to modem 110. If, for example, a particular data signal included in a channel is provided by modem 110 to the transmit section 206, which is transmitted and then received back by the receive section 208, then the signal provided to the modem 110 from time delay filter 272 comprises the particular data signal included in a channel as originally/initially provided by modem 110.

In some embodiments, the receive section 208 may further include one or more electrical components. For example, digital gain control may be provided between the adder 269 and the time delay filter 272 in order to appropriately amplify or provide signal gain to the phase decoded signal.

In this manner, DBF chip 107 is configured to both digitally process a first data signal, stream, or beam of a single channel for transmission by a first plurality of antenna elements; to receive a second data signal, stream, or beam of a single channel using a second plurality of antenna elements; and to digitally recover/reconstitute the original data signal underlying the received signal. The first and second plurality of antenna elements may be the same or different from each other. DBF chip 107 comprises a half duplex device, configured to operate in transmit mode or receive mode at any given time.

Each DBF chip of the plurality of DBF chips 106 is similarly configured and associated with a respective subset of the plurality of antenna elements 112. A common or single local oscillator 102 supports the plurality of DBF chips 106, rather than each DBF chip being supported by a dedicated local oscillator. A same subset of antenna elements can be used for transmit and receive signal paths within a chip. As an example, without limitation, each DBF chip of the plurality of DBF chips 106 supports up to 16 antenna elements (M=16) of the plurality of antenna elements 112. The common/single local oscillator 102 is capable of supporting up to 100 DBF chips (L=100) in synchronicity with a common LO signal and common reference clock signal.

Hence, cost savings is achieved by having a reduced number of electrical components within and supporting each DBF chip, space savings is achieved by the fewer number of electrical components, and/or power savings is achieved by not having to fully power transmit and receive components at all times or from the reduced number of electrical components.

Figure 4:
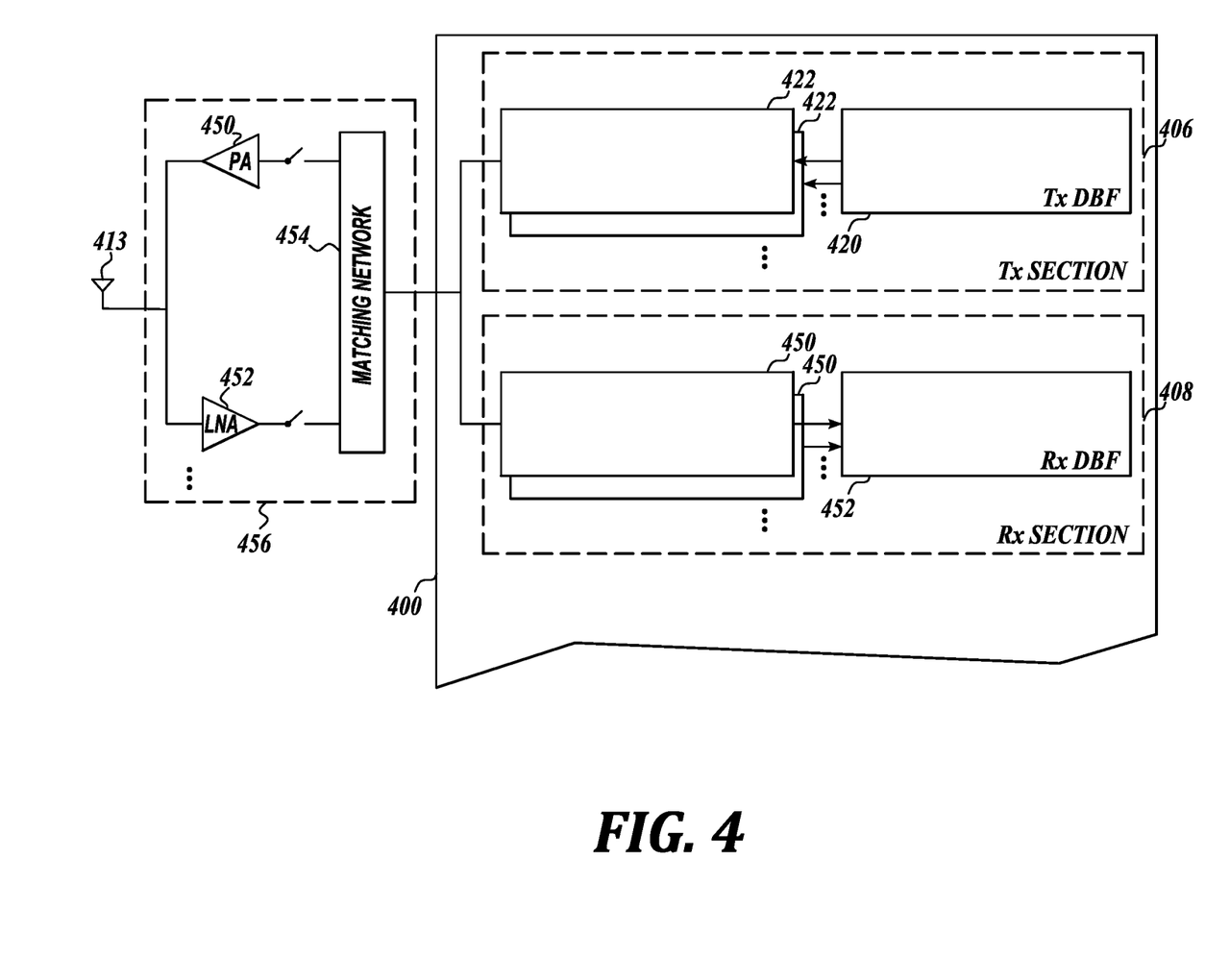
FIG. 4 is an example illustration showing circuity or electrical components included in and/or associated with a DBF chip in accordance with some embodiments of the present disclosure.

FIG. 4 is an example illustration showing circuity or electrical components included in and/or associated with a DBF chip 400 in accordance with some embodiments of the present disclosure. In an embodiment, DBF chip 400 is similar to DBF chip 107 shown in FIG. 2 except additional electrical components are included in the signal paths between an antenna element 413 and transmit and receive sections 406, 408. Antenna element 413, transmit section 406, receive section 408, transmit digital beamformer section 420, a plurality of transmit RF sections 422, receive digital beamformer section 452, and a plurality of receive RF sections 450 included in DBF chip 400 are similar to antenna element 113, transmit section 206, receive section 208, transmit digital beamformer section 220, plurality of transmit RF sections 222, receive digital beamformer section 252, and plurality of receive RF sections 250 of DBF chip 107, respectively. Disposed between antenna element 413 and a transmit RF section 422 is a PA 450. Disposed between antenna element 413 and a receive RF section 450 is a LNA 452.

Referring to FIG. 2, the functionality of PA 244 can be configured in two electrical components—a pre-PA (PPA) included in DBF chip 107 and a PA located external to DBF chip 107. PA 450 shown in FIG. 4 is an example of PA 244 implemented as two electrical components, in which the PA located external to the chip comprises PA 450. Similarly, the functionality of LNA 254 can be configured in two electrical components—a pre-LNA (PLNA) included in DBF chip 107 and a LNA located external to DBF chip 107. LNA 452 shown in FIG. 4 is an example of LNA 254 implemented as two electrical components, in which the LNA located external to the chip comprises LNA 452.

PA 450 and LNA 452 can be packaged together in a single IC chip (such as IC chip 456) or in separate packages/chips. In some embodiments, IC chip 456 can include additional electrical components such as, but not limited to, an impedance matching network 454 disposed between PA 450 and transmit section 406 and also between LNA 452 and receive section 408.

The signal path associated with each of the remaining antenna elements and transmit and receive sections can include similar PA and LNA external to the DBF chip. If a chip or package such as IC chip 456 is implemented, then the externally located PAs and LNAs associated with such remaining antenna elements may also be included in the IC chip 456. Alternatively, a separate IC chip or package including a PA, LNA, and impedance matching network can be disposed between an antenna element and its associated transmit and receive sections for each of the antenna elements.

Although PA 450 and LNA 452 are shown disposed between antenna element 413 and the switches, PA 450 and LNA 452 can be disposed between the switches and transmit and receive RF sections 422, 450.

In some embodiments, one or more of the transmit or receive signal paths of DBF chip 107 can be effectively enabled or disabled by dynamic control of multiple enabling signal(s) inside DBF chip 107.

Examples of the devices, systems, and/or methods of various embodiments are provided below. An embodiment of the devices, systems, and/or methods can include any one or more, and any combination of, the examples described below.

Example 1 is a device included in a communications system, the device including a plurality of antenna elements configured in a phased array antenna; a plurality of integrated circuit (IC) chips, wherein each IC chip of the plurality of IC chips is associated with a respective subset of antenna elements of the plurality of antenna elements, and wherein, for each IC chip of the plurality of IC chips, the associated subset of antenna elements is used for transmitting and receiving radio frequency (RF) signals by the IC chip; and a local oscillator configured to generate a common local oscillator signal and provide the common local oscillator signal to each IC chip of the plurality of IC chips.

Example 2 includes the subject matter of Example 1, and further includes a hierarchical network electrically coupled between the local oscillator and each IC chip of the plurality of IC chips.

Example 3 includes the subject matter of any of Examples 1-2, and further includes wherein a signal pathway length between the local oscillator and each IC chip of the plurality of IC chips is equal to each other.

Example 4 includes the subject matter of any of Examples 1-3, and further includes wherein the hierarchical network comprises an H-network, an H-tree network, a fractal network, a self-similar fractal network, a tree network, a star network, a hybrid network, a rectilinear network, a curvilinear network, a rectilinear H-network, a curvilinear H-network, or a multiplex feed network.

Example 5 includes the subject matter of any of Examples 1-4, and further includes a reference clock configured to generate a reference signal, wherein the local oscillator is configured to generate the common local oscillator signal based on the reference signal, and wherein the local oscillator signal defines an unmodulated frequency associated with transmitting or receiving the RF signals.

Example 6 includes the subject matter of any of Examples 1-5, and further includes wherein the local oscillator is configured to generate a reference clock signal, and wherein the common local oscillator signal and the reference clock signal are provided to each IC chip of the plurality of IC chips.

Example 7 includes the subject matter of any of Examples 1-6, and further includes wherein the local oscillator signal comprises a 5 GigaHertz (GHz) signal and the reference clock signal comprises a 60 MegaHertz (MHz) signal.

Example 8 includes the subject matter of any of Examples 1-7, and further includes wherein each IC chip of the plurality of IC chips includes a transmit section and a receive section, wherein the transmit section is configured to receive a first data signal, process the first data signal using a plurality of transmit signal paths included in the transmit section, and generate a plurality of second RF signals to be transmitted, wherein each second RF signal of the plurality of second RF signals is provided to a respective antenna element of the subset of antenna elements associated with the IC chip for transmission, wherein each antenna element of the subset of antenna elements associated with the IC chip is configured to a receive a respective third RF signal of a plurality of third RF signals, and wherein the receive section is configured to process each third RF signal of the plurality of third RF signals using a respective receive signal path of a plurality of receive signal paths included in the receive section, and generate a fourth data signal to provide to a modem.

Example 9 includes the subject matter of any of Examples 1-8, and further includes wherein the subset of antenna elements associated with the IC chip is electrically coupled to the transmit section or the receive section at a given time.

Example 10 includes the subject matter of any of Examples 1-9, and further includes wherein a number of antenna elements of the subset of antenna elements associated with the IC chip equals a number of transmit signal paths of the plurality of transmit signal paths or a number of receive signal paths of the plurality of transmit signal paths.

Example 11 includes the subject matter of any of Examples 1-10, and further includes wherein the transmit section includes a digital beamforming section and a RF section, and wherein each second RF signal of the plurality of second RF signal comprises a phase and time delay encoded signal generated by the digital beamforming section and provided on a carrier RF signal by the RF section.

Example 12 is an apparatus including a first digital beamformer (DBF) associated with a first subset of antennas of a phased array antenna, the first DBF including a first time delay filter associated with transmission of a first signal, a first plurality of phase shifters associated with transmission of the first signal, a first plurality of mixers associated with transmission of the first signal, a second time delay filter associated with receiving of a second signal, a second plurality of phase shifters associated with receiving of the second signal, and a second plurality of mixers associated with receiving of the second signal; and a second DBF associated with a second subset of antennas of the phased array antenna, wherein the first and second DBFs are configured to receive a local oscillator signal from a common local oscillator.

Example 13 includes the subject matter of Example 12, and further includes the common local oscillator and a hierarchical network configured to provide the local oscillator signal from the common local oscillator to each of the first and second DBFs in an equal signal pathway length from each other.

Example 14 includes the subject matter of any of Examples 12-13, and further includes wherein the first and second DBFs are configured to receive a reference clock signal from the common local oscillator, and wherein the reference clock signal received by each of the first and second DBFs has a same phase relative to each other.

Example 15 includes the subject matter of any of Examples 12-14, and further includes wherein the first DBF and the first subset of antennas switch between a transmit mode to transmit the first signal or a receive mode to receive the second signal.

Example 16 includes the subject matter of any of Examples 12-15, and further includes a frequency multiplier included in each of the first and second DBFs, wherein the local oscillator signal is increased in frequency by the frequency multiplier in each of the first and second DBFs, and wherein the local oscillator signal increased in frequency comprises an input to mixers included in each of the first and second DBFs.

Example 17 is an integrated circuit (IC) chip including a transmit section comprising a first digital baseband section and a plurality of first radio frequency (RF) sections, wherein the first digital baseband section includes a first time delay filter and a plurality of first phase shifters, wherein a plurality of transmit signal processing paths are defined in the transmit section, wherein each transmit signal processing path of the plurality of transmit signal processing paths includes a respective first phase shifter of the plurality of first phase shifters and a respective first RF section of the plurality of first RF sections; and a receive section comprising a plurality of second RF sections and a second digital baseband section, wherein the second digital baseband section includes a second time delay filter and a plurality of second phase shifters, wherein a plurality of receive signal processing paths are defined in the receive section, wherein each receive signal processing path of the plurality of receive signal processing paths includes a respective second phase shifter of the plurality of second phase shifters and a respective second RF section of the plurality of second RF sections, wherein the IC chip and a second IC chip receive a same local oscillator signal from a single local oscillator, and wherein the IC chip switches between operation of the transmit section or the receive section using the same local oscillator signal.

Example 18 includes the subject matter of Example 17, and further includes wherein a same set of antenna elements of a phased array antenna selectively electrically couples with the plurality of transmit signal processing paths or the plurality of receive signal processing paths.

Example 19 includes the subject matter of any of Examples 17-18, and further includes wherein a hierarchical network is electrically coupled between the single local oscillator and each of the IC chip and the second IC chip, and wherein a first signal path length between the single local oscillator and the IC chip is equal to a second signal path length between the single local oscillator and the second IC chip.

Example 20 includes the subject matter of any of Examples 17-19, and further includes wherein the IC chip and the second IC chip are included in a communication node of a satellite communications system.

Example 21 includes the subject matter of any of Examples 17-20, and further includes wherein each of the IC chip and the second IC chip receive a same reference clock signal from the single local oscillator.

Example 22 includes the subject matter of any of Examples 17-21, and further includes wherein a third IC chip receives the same local oscillator signal from the single local oscillator, wherein a modem is configured to provide a data signal to the transmit section to process for transmission, and wherein the IC chip is electrically coupled between the modem and the second IC chip, and the second IC chip is electrically coupled between the IC chip and the third IC chip.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

What we claim is:

1. A device included in a communications system, the device comprising:
    a plurality of antenna elements configured in a phased array antenna;
    a plurality of integrated circuit (IC) chips, wherein each IC chip of the plurality of IC chips is associated with a respective subset of antenna elements of the plurality of antenna elements, and wherein, for each IC chip of the plurality of IC chips, the associated subset of antenna elements is used for transmitting and receiving radio frequency (RF) signals by the IC chip; and
    a local oscillator comprising a first phase lock loop (PLL) configured to generate a first local oscillator signal and a second PLL configured to generate a second local oscillator signal, wherein the local oscillator is configured to selectively provide the first local oscillator signal or the second local oscillator signal as a common local oscillator signal to each IC chip of the plurality of IC chips, wherein:
    the first local oscillator signal and the second local oscillator signal are concurrently generated based on a common reference signal; and
    the first local oscillator signal has a first frequency and the second local oscillator signal has a second frequency, different from the first frequency.

2. The device of claim 1, further comprising a hierarchical network electrically coupled between the local oscillator and each IC chip of the plurality of IC chips, wherein the hierarchical network comprises a H-network, a H-tree network, a fractal network, a self-similar fractal network, a tree network, a star network, a hybrid network, a rectilinear network, a curvilinear network, a rectilinear H-network, a curvilinear H-network, or a multiplex feed network.

3. The device of claim 2, wherein a signal pathway length between the local oscillator and each IC chip of the plurality of IC chips is equal to each other.

4. The device of claim 1, wherein the common local oscillator signal defines an unmodulated frequency associated with transmitting or receiving the RF signals.

5. The device of claim 1, wherein the local oscillator is configured to generate a reference clock signal, and wherein the common local oscillator signal and the reference clock signal are provided to each IC chip of the plurality of IC chips.

6. The device of claim 1, wherein:
    each IC chip of the plurality of IC chips includes a transmit section and a receive section;
    the transmit section is configured to receive a first data signal, process the first data signal using a plurality of transmit signal paths included in the transmit section, and generate a plurality of second RF signals to be transmitted;
    each second RF signal of the plurality of second RF signals is provided for transmission to a respective antenna element of the respective subset of antenna elements associated with the IC chip;
    each antenna element of the subset of antenna elements associated with the IC chip is configured to a receive a respective third RF signal of a plurality of third RF signals; and
    the receive section is configured to process each third RF signal of the plurality of third RF signals using a respective receive signal path of a plurality of receive signal paths included in the receive section, and generate a fourth data signal to provide to a modem.

7. The device of claim 6, wherein the subset of antenna elements associated with the IC chip is electrically coupled to the transmit section or the receive section at a given time.

8. The device of claim 6, wherein a number of antenna elements of the subset of antenna elements associated with the IC chip equals a number of transmit signal paths of the plurality of transmit signal paths or a number of receive signal paths of the plurality of receive signal paths.

9. The device of claim 6, wherein the transmit section includes a digital beamforming section and a RF section, and wherein each second RF signal of the plurality of second RF signal comprises a phase and time delay encoded signal generated by the digital beamforming section and provided on a carrier RF signal by the RF section.

10. The device of claim 8, wherein:
    generating the plurality of second RF signals to be transmitted comprises up converting, based on the common local oscillator signal, the first data signal to a RF transmission frequency, wherein, during generating the plurality of second RF signals to be transmitted, the local oscillator is configured to selectively provide the first local oscillator signal as the common local oscillator signal and the subset of antenna elements associated with the IC chip is electrically coupled to the transmit section, and generating the fourth data signal comprises down converting, based on the common local oscillator signal, the plurality of third RF signals to a baseband frequency, wherein, during generating the fourth data signal, the local oscillator is configured to selectively provide the second local oscillator signal as the common local oscillator signal and the subset of antenna elements associated with the IC chip is electrically coupled to the receive section.

11. The device of claim 1, wherein the local oscillator comprises a first phase lock loop (PLL) configured to generate the first local oscillator signal and a second PLL configured to generate the second local oscillator signal.

12. The device of claim 11, wherein a reference clock provides a common reference clock signal to the first PLL and the second PLL.

\* \* \* \* \*

UNITED STATES PATENT AND TRADEMARK OFFICE
CERTIFICATE OF CORRECTION

PATENT NO. : 11,855,362 B2
APPLICATION NO. : 16/865401
DATED : December 26, 2023
INVENTOR(S) : Masoud Kahrizi et al.

It is certified that error appears in the above-identified patent and that said Letters Patent is hereby corrected as shown below:

In the Claims

Claim 9, (Column 16, Line 62): Change "signal comprises" to --signals comprises--.

Signed and Sealed this
Twenty-sixth Day of March, 2024

Katherine Kelly Vidal
*Director of the United States Patent and Trademark Office*